US006825985B2

(12) United States Patent
Brown et al.

(10) Patent No.: US 6,825,985 B2
(45) Date of Patent: Nov. 30, 2004

(54) AUTOSTEREOSCOPIC DISPLAY WITH ROTATED MICROLENS AND METHOD OF DISPLAYING MULTIDIMENSIONAL IMAGES, ESPECIALLY COLOR IMAGES

(75) Inventors: Daniel M. Brown, Madison, AL (US); Peter Scott Erbach, Harvest, AL (US); Joseph Larry Pezzaniti, Harvest, AL (US); Takahisa Minamitani, Lacey Spring, AL (US)

(73) Assignee: MEMS Optical, Inc., Huntsville, AL (US)

( * ) Notice: Subject to any disclaimer, the term of this patent is extended or adjusted under 35 U.S.C. 154(b) by 0 days.

(21) Appl. No.: 10/194,276

(22) Filed: Jul. 15, 2002

(65) Prior Publication Data

US 2003/0016444 A1 Jan. 23, 2003

Related U.S. Application Data

(60) Provisional application No. 60/304,741, filed on Jul. 13, 2001.

(51) Int. Cl.[7] .............................................. B02B 27/10
(52) U.S. Cl. ......................... 359/619; 359/621; 345/32; 345/55
(58) Field of Search .......................... 359/619, 621–626; 349/95; 345/32, 48–51, 55; 382/154

(56) References Cited

U.S. PATENT DOCUMENTS

| 3,409,351 | A |   | 11/1968 | Winnek |
| 5,666,226 | A | * | 9/1997 | Ezra et al. ................... 359/621 |
| 5,723,264 | A |   | 3/1998 | Robello et al. |
| 5,956,001 | A | * | 9/1999 | Sumida et al. ................ 345/55 |
| 6,064,424 | A | * | 5/2000 | van Berkel et al. ........... 348/51 |
| 6,118,584 | A | * | 9/2000 | Van Berkel et al. ......... 359/463 |
| 2001/0048507 | A1 | * | 12/2001 | Thomas et al. ............... 353/10 |

FOREIGN PATENT DOCUMENTS

| EP | 0 791 847 A | 8/1997 |
| EP | 1 054 270 A | 11/2000 |

* cited by examiner

*Primary Examiner*—Huy Mai
(74) *Attorney, Agent, or Firm*—Keady, Olds & Maier PLLC

(57) ABSTRACT

A display and method of displaying multidimensional images on an autostereoscopic display includes establishing a lenslet array to include a plurality of lens elements. There is an interlacing of a plurality of multiple images on the display with a fanning of the multiple images out into an angular array. The method establishes a plurality of views in a vertical and horizontal direction. A mapping of a plurality of views onto a plurality of pixels makes up the display and a three dimensional image is generated from the fanned out multiple images.

33 Claims, 12 Drawing Sheets

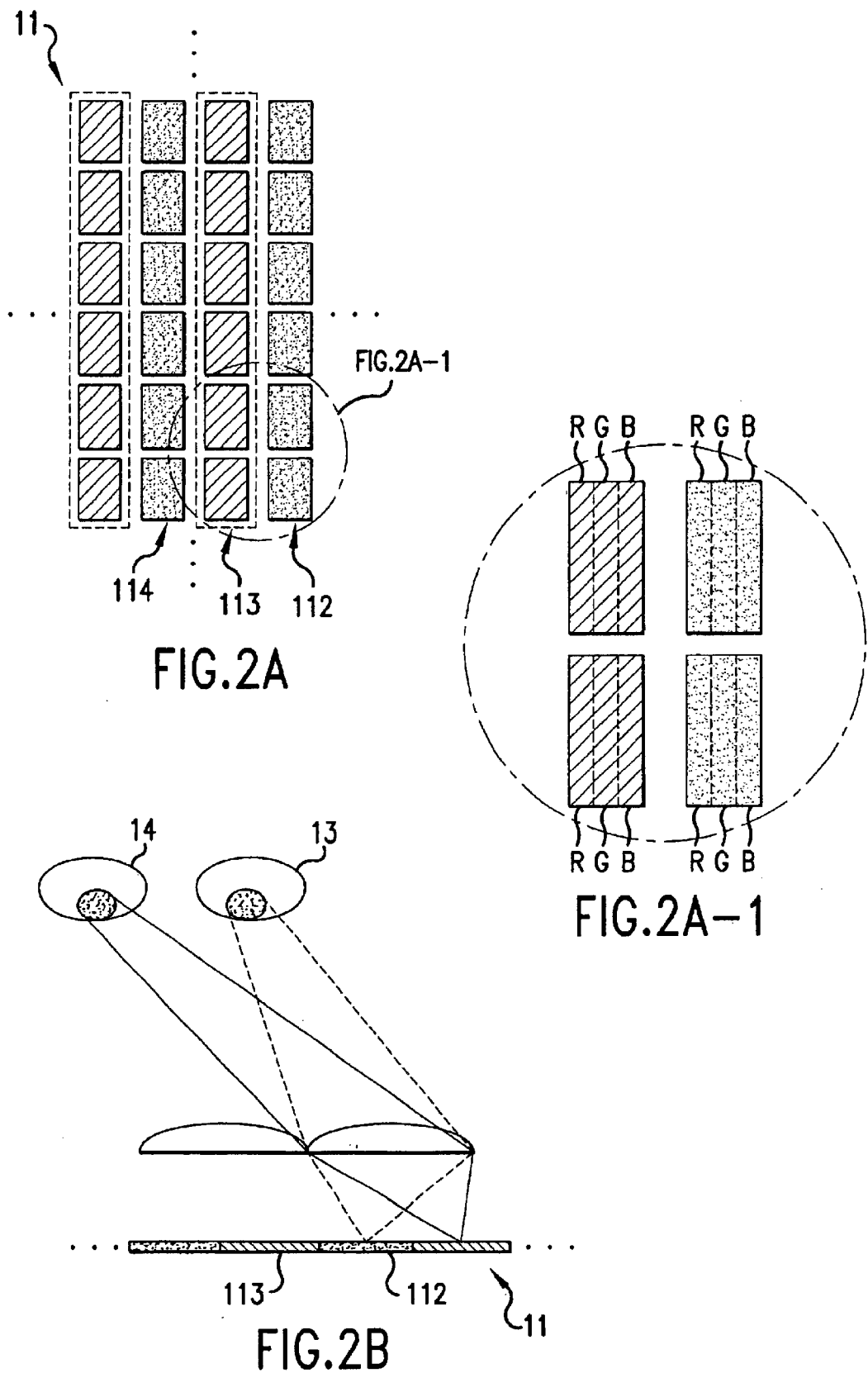

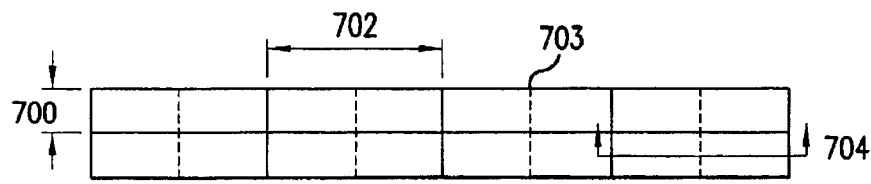
FIG.7A
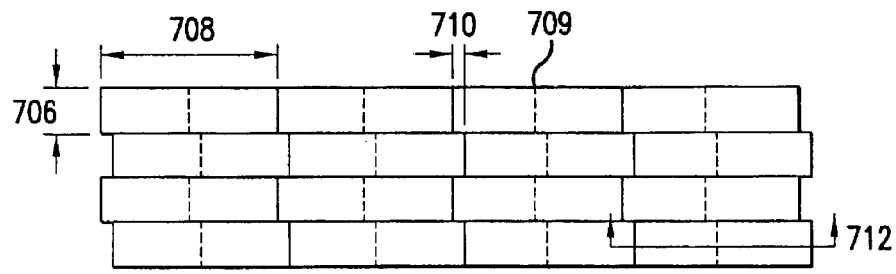
FIG.7B
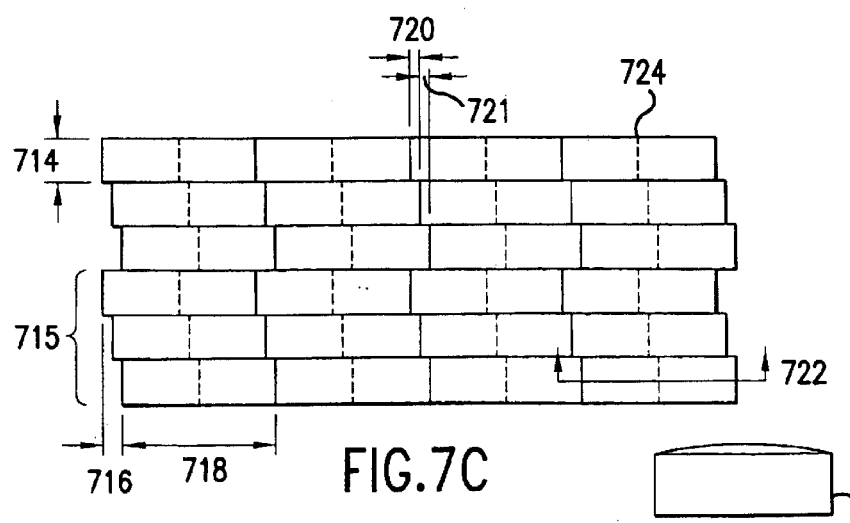
FIG.7C

US 6,825,985 B2

AUTOSTEREOSCOPIC DISPLAY WITH ROTATED MICROLENS AND METHOD OF DISPLAYING MULTIDIMENSIONAL IMAGES, ESPECIALLY COLOR IMAGES

CROSS REFERENCE TO RELATED APPLICATIONS

This nonprovisional application claims priority under 35 U.S.C. §119(e) on U.S. Provisional Application No. 60/304,741 filed on Jul. 13, 2001, which is herein incorporated by reference.

The present invention is related to co-pending application entitled "AUTOSTEREOSCOPIC DISPLAY AND METHOD OF DISPLAYING MULTIDIMENSIONAL IMAGES, ESPECIALLY COLOR IMAGES," U.S. patent application Ser. No. 09/492,315, the contents of which is expressly incorporated herein by reference.

FIELD OF THE INVENTION

The present invention is directed to an autostereoscopic display and method of displaying multidimensional images on the display. More particularly, the autostereoscopic display of the present invention includes a lenslet array of rotated cylindrical lenses positioned between a viewer and a pixel array. The present invention allows the interlacing of multiple image views by using segmented lenslets. The use of grayscale technology controls the lenslet shape and rotation very precisely to control the blurring and blending of views. An autostereoscopic display in accordance with the present invention is particularly advantageous for creating stereoscopic displays in conjunction with color pixel arrays.

BACKGROUND OF THE INVENTION

Conventionally, three-dimensional displays of images have been achieved by using stereoscopic displays. A stereoscopic display is a display providing multidimensional image cues to a viewer by combining two alternative two-dimensional views of the same object or scene. Each view is observed by one of the viewer's eyes and the two views are subsequently integrated by the human visual system to form a three-dimensional (3-D) image as perceived by the viewer, through the display.

A simple example of an autostereoscopic display is the classic 3-D image and accompanying 3-D glasses used to view the image. The 3-D image contains superimposed red and green images slightly offset from each other and independently representing an object from separate, slightly different perspectives. The overlapped red and green images are integrated when a viewer wearing glasses with a red-color filter over one eye and a green-color filter over the other eye views the image and the respective perspectives are directed independently to the respective eyes receiving the image information. The result observed by the viewer is that the image appears to have a limited amount of spatial depth.

There are problems associated with using these types of 3-D glasses. First, they are usually flimsy and bulky and not well suited for ordinary wear. Furthermore, subjects that are residing in the images when viewed without the 3-D glasses are not easily discerned. Also, they do not interface well with individuals who need to wear corrective lenses.

To address such aforementioned problems and disadvantages, it is desirable to have autostereoscopic displays requiring no special glasses or other type of head-mounted equipment to bring the alternative views to each of the viewer's eyes. In one example, conventional autostereoscopic displays have been implemented on an LED display, by alternately generating light emitting lines on the display representing interlaced left and right eye images and respectively directing the interlaced left and right images to a viewer's left and right eyes. Such an implementation may require construction of a specialized flat panel display and/or display driver incorporating the capability to generate the light emitting "lines" or interlaced images. This type of display would be capable of replacing conventional backlit display sources.

Other conventional autostereoscopic displays have been proposed with lenses positioned in alignment with display picture elements. However, there are problems arising with this approach, because the interlaced left and right eye images directed at fixed viewing angles do not necessarily represent a viewer's actual left eye and right eye viewing zones. Further, such an implementation may also require construction of a specialized flat-panel display incorporating cylindrical lenses embedded within the display picture elements structure. Also, because such lenses are aligned, interference pattern noise or moire patterns may result from spatial mismatches between pixel edges and cylindrical lens edges when viewed off-axis. Such alignment may further result in projection of images outside the viewer's proper left and right eye viewing zones. Additional problems may arise when one attempts to implement autostereoscopic display on color displays.

Color displays are normally constructed with pixels having a plurality of color elements such as red, green, and blue arranged alongside each other along a generally horizontal line of the display relative to a position of intended use. Another common characteristic of conventional displays is that the color elements associated with the pixels tend to be vertically aligned so that, for example, red, green, and blue elements are vertically aligned with each other throughout the display. In this case, problems arise in displaying color images in such a situation since the focal axis of a typical lens is vertical and thus the point focus in a color display where color elements are vertically aligned would be on only one color at a time, thereby distorting the color rendering for the image.

Consequently, in order to create an autostereoscopic color display which accurately renders color, the display should be rotated ninety degrees or otherwise physically altered to achieve a change in orientation, so that the color elements of the pixels are arranged vertically one above the other. Color elements of pixels are then appropriately oriented with respect to the vertical focal axis of the lens. It should be noted that rotating or otherwise physically altering the display may require modification to any software drivers that support the display. Thus, the extent to which existing or conventional displays may be adapted to provide stereoscopic images is limited, because of this rotation and other such alterations required of the display.

For a better understanding of the characteristics of known systems, reference is made to an exemplary autostereoscopic display as shown in FIG. 1A. Included is a pixel array 11, having several pixel groups 111. These pixel groups typically include three color elements such as red, green, and blue (RGB). A lenticular array 12 is positioned adjacent to pixel array 11 separated by a distance "d" which varies based on the desired or anticipated distance S between a viewing perspective represented in FIG. 1A as, for example, eyes 13–14 [left eye (13) and right eye (14)] and the front of the autostereoscopic display. As will be understood by one skilled in the art, each pixel group 111 includes pixel columns corresponding to independent image perspectives which, when viewed together form the autostereoscopic display image.

In accordance with the autostereoscopic display illustrated in FIG. 1A, lenticular array 12 includes several adjacent lenses, each lens 121–123 within lenticular array 12 corresponding to different pixel columns 112–113 within the pixel groups 111 of the pixel array 11. By anticipating both the distance S between a viewer and the lenticular array 12 located at the front of the pixel array 11 and the desired separation "d" between pixel lens arrays 11 and 12, an appropriate pitch WL for lenses 121–123 within a lenticular array of the display may be calculated (described later in greater detail) such that the autostereoscopic effect is achieved. A desired separation d between the pixel and lenticular arrays 11 and 12 may be determined based on various criteria, such as the size and/or appearance of the resulting display. Typically, the separation d is representative of the focal length of the lenses that are used to make up the lenticular array.

Further, reference is made to an exemplary autostereoscopic display as illustrated in FIG. 1B. It should be noted that due to the similarity between FIG. 1A and FIG. 1B, the reference numerals shown in FIG. 1B and the accompanying discussion herein below relate to aspects of the display which differ from those aspects already illustrated in FIG. 1A.

The displays shown in FIGS. 1A and 1B differ with respect to the alignment of the lenses within lenticular array 12 relative to the pixel groups 111 within pixel array 11. FIG. 1B illustrates a configuration in which the position of the lenticular array 12 is shifted slightly from the position shown in FIG. 1A relative to pixel array 11, or alternatively, the viewing position is shifted. Specifically, in FIG. 1B, the center of lens 124 within lenticular array 12 is aligned with the center of pixel group 111' within pixel array 11 with respect to the long axis of the cylindrical lenses within lenticular array 12. In FIG. 1B, this alignment is achieved at eye bisector 15. The bisector is a line which bisects the distance between the left eye 13 and the right eye 14 of the viewing observer.

This alignment is preferably achieved at a point which is the center of the autostereoscopic display. Because of this alignment, the lenses 124–126 of FIG. 1B, each correspond to pixel columns 112–113 within a single pixel group 111 or 111', in contrast with the lenses of FIG. 1A which each correspond to pixel columns 112–113 in different pixel groups 111. Nevertheless, the pitch WL of lenses 124 and 126 remains smaller than the pitch 2WP of corresponding pixel columns 111 and 111', such that lenses 125–126 other than central lens 124 are offset from their corresponding pixel columns 111 with respect to the long axis of cylindrical lens within lenticular array 12. Therefore, for reasons similar to those discussed above, the offset between the center of lenses 125–126 and their corresponding pixel columns 111 increases as the distance from central lens 124 increases. Such offsets are desirable for independent viewing of right and left interlaced image "slices" by respective right and left eyes as will be described in greater detail later.

FIG. 2A illustrates a front view of a portion of a pixel array arranged to simultaneously display two views of an image to enable an autostereoscopic display. FIG. 2A-1 shows that pixel columns 112 and 113 are configured to display color images, shown, for example, as having R,G,B color elements. It should further be noted that due to conventional methods of construction, R,G, and B color elements are typically vertically aligned leading to particular disadvantages associated with retrofitting such conventional displays for autostereoscopic display. As can be seen in FIG. 2B, left and right view information may be arranged on pixel array 11, so that images directed toward the left eye 13 and images directed toward the right eye 14 are interlaced. Thus, images intended to be viewed by the left and right eye are displayed on alternating pixel columns 112, 113 within the pixel array 11. Note that although pixel array 11 includes several pixel columns, a sample of only four pixel columns from within pixel array 11 is illustrated in FIGS. 2A and 2B. It should be further noted that while the disadvantages are described with reference to color elements including R,G, and B, typical displays may contain more green color elements per line than other displays. A typical ratio of two green elements to every one red element and one blue element is represented by the ratio 2G:1R:1B.

As previously described, pixel array 11 includes several pixel columns arranged in parallel to the longitudinal axis of cylindrical lenses within lenticular lens array 12. Lenses are preferably arranged such that left eye 13 perceives an image created by visually joining all pixel columns 112 associated with a left eye image, designated in FIG. 2A by dark shading. Right eye 14 preferably perceives an image created by visually joining all pixel columns 113 associated with a right eye image, designated in FIG. 2A by diagonal lines. It should be noted that the resolution achieved by a stereoscopic device is related to the number of pixel columns found in the display and the number of pixel columns per pixel group. A flat screen display with P pixel columns that each have Q pixels has a non-autostereoscopic image resolution of P×Q pixels. By contrast, the same flat screen display has an autostereoscopic image resolution equal to P*Q/n pixels, assuming n views in the autostereoscopic display. As an example, in the exemplary systems illustrated in FIGS. 1A through 2B, the image resolution would be P*Q/2 pixels, since each pixel group 111 has two (2) pixel columns 112–113 to achieve two (2) separate views.

However, disadvantages occur where color elements are vertically aligned, because the focus of a cylindrical lens may fall on only one color element of an associated pixel column. It will be appreciated that in order to view a relatively natural undistorted color representation of an image, all color elements of an associated pixel must be viewed. Some systems have addressed this problem by rotating the display 90 degrees or by using more than one lenticular layer of lenses. Both of these solutions are relatively difficult to use. For example, a lenticular mask or overlay layer over a conventional display used in a conventional manner to achieve an autostereoscopic display.

Therefore, it would be desirable to provide a method of providing an autostereoscopic display capability particularly suitable for color displays. Such a method and associated apparatus would preferably allow the use of a conventional display having a pixel array and color elements associated with each of the pixels. The present invention also addresses the problems mentioned previously, as well as the ability to eliminate or minimize the effect of unwanted visual artifacts (such as blacklines) and improving the interlacing of multiple images.

Other and further objects, features and advantages of the present invention will be set forth in the description that follows, and in part, will become apparent from the detailed description, or may be learned by practice of the invention.

SUMMARY OF THE INVENTION

To address the disadvantages posed in adapting conventional displays to provide autostereoscopic display, a method and apparatus are described in accordance with various exemplary embodiments of the present invention for supplying a stereoscopic image when a display is viewed from an intended viewing perspective. A pixel array associated with the display may include a plurality of pixels, each having at least two subpixel elements, e.g. color elements, the pixels extending in a generally horizontal direction from the intended viewing perspective. A lenslet array including a plurality of lenses may be positioned between the intended viewing perspective and the pixel array, and may further be configured to transpose a focus orientation associated with the subpixels from a generally vertical orientation to a generally horizontal orientation such that the subpixel elements are brought within the transposed focus orientation which is generally diagonal. By transposing the focal orientations in such a manner, all color elements associated with a pixel are brought into focus despite vertical alignment of color subpixel elements. Thus each pixel in the pixel array is focused by a corresponding one of the plurality of lenses although the correspondence of pixels to lenses is preferably two pixels for each microlens or lens element in the lenslet array. Thus the lenslet array includes a plurality of rotated cylindrical lenses having a generally diagonal focus. Each of the pixels has at least three subpixel elements, including a red subpixel element, a green subpixel element and a blue subpixel element.

In accordance with alternative exemplary embodiments of the present invention, an autostereoscopic display is provided with a pixel array including a plurality of pixel groups and a lenslet array positioned between the pixel array and a viewing perspective. It should be noted that the lenslet array is configured to transpose a focus orientation and includes a plurality of lenses corresponding generally to a plurality of pixels of the pixel array such that such that each of the plurality of lenses of the lenslet array corresponds to each of the pixel groups. One exemplary number of pixels associated with the pixel group is two (e.g. each lens corresponds to two pixels) with the orientation of the two pixels being side by side. It should further be noted that the plurality of pixels include a plurality of color pixels and each of the color pixels includes at least two color components arranged in a first direction, e.g. generally horizontal with respect to the normal physical orientation of the display (also horizontal), and lenses of the lenslet array are preferably rotated cylindrical lenses having a transposed focal axis from around a second direction, e.g. vertical, to the first direction generally perpendicular to the second direction. Note that the orientation directions of horizontal and vertical are usually given with respect to the eyes that are viewing the display, although other frames or reference can be used without departing from the scope and spirit of the present invention.

Further, in accordance with alternative exemplary embodiments of the present invention, each of the pixels includes at least two color components arranged in a horizontal direction with respect to the display, and the plurality of lenses of the first array comprise rotated cylindrical lenses having a transposed axis extending from around a vertical direction to around the horizontal direction with respect to the display according to an arbitrary axis of rotation.

In another exemplary embodiment a autostereoscopic display for supplying a stereoscopic image when viewed from an intended viewing perspective includes a lenslet array including a plurality of lens elements. A cylindrical axis runs down the center of each lens element in the lenslet array and wherein the cylindrical axis can be tilted at an angle that is dependent upon a layout and an orientation of a plurality of display pixels of the autostereoscopic display. The cylindrical axis can be tilted at an angle between 5 and 55 degrees. An image formed on the display pixels implements a black line removal process by blurring and rotating an image. The blurring and rotating of the image is performed in accordance with an established blurring and rotating value. The lenslet array used can be a lenslet array. The lens element used can be a microlens element.

In another exemplary embodiment, a method of displaying multidimensional images on an autostereoscopic display includes establishing a lenslet array to include a plurality of lens elements. There is an interlacing of a plurality of multiple images on the display with a fanning of the multiple images out into an angular array. The method establishes a plurality of views in a vertical and horizontal direction. A mapping of a plurality of views onto a plurality of pixels making up the display and a three dimensional image is generated from the fanned out multiple images.

The method further includes establishing a lenslet array including a plurality of lens elements; using a cylindrical axis running down the center of each lens element in the lenslet array. The cylindrical axis can be tilted at an angle that is dependent upon a layout and an orientation of a plurality of display pixels of the autostereoscopic display. The cylindrical axis can be tilted at an angle between 5 and 55 degrees. An image formed on the display pixels implements a black line removal process by blurring and rotating an image. The blurring and rotating of the image is performed in accordance with an established blurring and rotating value.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A is a diagram illustrating an exemplary pixel array arranged to simultaneously display two views of an image preferably in color;

FIG. 2A-1 illustrates a more detailed view of the pixel array;

FIG. 2A-2 illustrates an exemplary arrangement of pixels;

FIG. 2B is a diagram illustrating stereoscopic display from a viewing perspective of an exemplary pixel array arranged to simultaneously display two views of an image;

FIGS. 7A, 7B and 7C illustrate various exemplary layouts of a lenslet in relation to a lenslet array;

DETAILED DESCRIPTION OF THE PREFERRED EMBODIMENTS

Figure 1A:
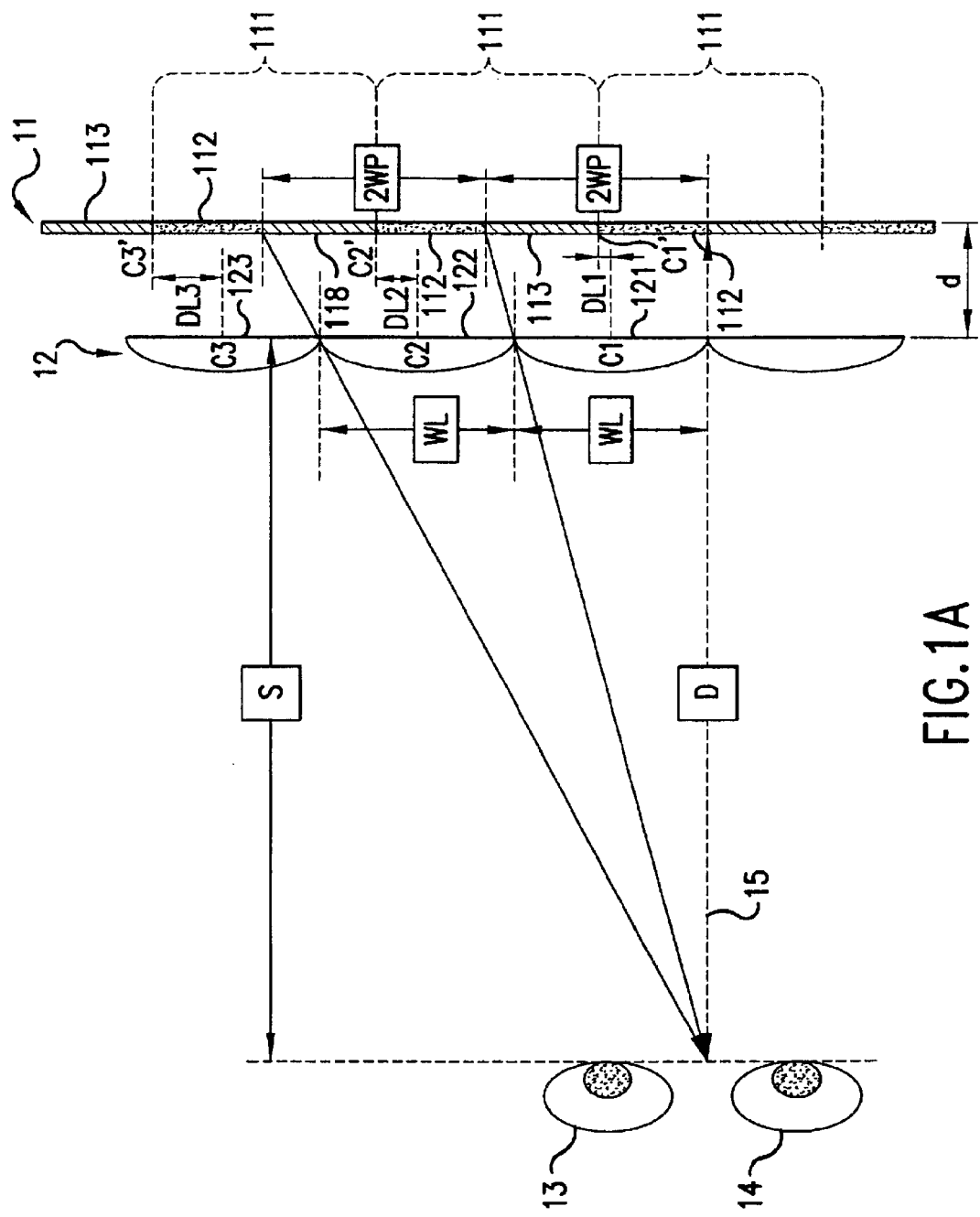
FIG. 1A is a diagram illustrating an exemplary structural orientation of a pixel array and a lenticular array.

Reference will now be made in detail to the preferred embodiments of the present invention, examples of which are illustrated in the accompanying drawings. In the drawings, redundant description of like elements and processes, which are designated with like reference numerals, is omitted for brevity.

The present invention describes a 3-D autostereoscopic display realized with a flat-screen color display and a micro-lens array. Interlacing multiple images on the display and fanning the images out in an angular array of images generates the 3-D image.

For a complete understanding of the present invention, reference is again made to an exemplary autostereoscopic display as shown in FIG. 1A. FIG. 1A shows an exemplary 2-view 3-D display. The left and right eye views are projected to the left and right of an imaginary dividing line. In one example, the green pixels may be used to represent the image pixels intended to be viewed by the right eye, and blue pixels may represent the image pixels that are viewed by the left eye. The lenticular array images the pixels nominally at infinity, such that the light from the right view is projected at positive angles and light from the left view is projected at negative angles.

Please note that those skilled in the art will appreciate that a lenticular array is a subset of a lenslet array. A lenslet array is a more general term, whereas a lenticular array is usually used to refer to a linear array of generally cylindrical lenses. A lenslet array can be: an array of cylindrical lenses, segments of lenses, or any arbitrary organization of lenses. Lenslets may be a microlens. These different lens arrays and lens components will all work and can be used interchangeably without departing from the spirit and scope of the present invention.

Returning to our discussion of FIG. 1A, if one views the image from above (the position illustrated by left and right eyes 13, 14) and positions their nose above the dividing line 15, the left eye 13 will see the left view (including pixels 113) and the right eye will see the right view (including pixels 112). Each pixel may be composed of red, green and blue pixels.

Figures 2, 2A:
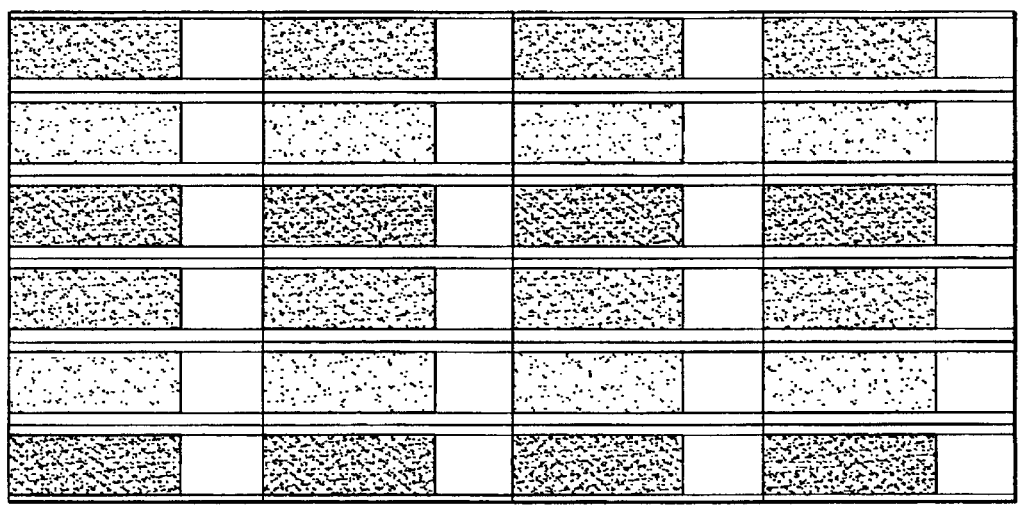

Included is a pixel array 11, which may be an LCD display, or the like, having several pixel groups 111 typically including, for example, at least two color elements and preferably three color elements such as, for example, red, blue, and green (RGB), or like color elements as are known in the art. FIG. 2A-2 shows an exemplary arrangement of pixels. A single pixel is considered to be at least a triplet of red, green and blue pixels. FIG. 2A-2 shows two rows and four columns of RGB triplets. The colored area (denoted by the red, green and blue pixels shown in 2A-1) indicates the active area, or the area that emits light. Approximately 30% of linear dimension along between the RGB triplets in the horizontal direction is dead space. That is, no light is emitted from these areas. Approximately 10% of the linear dimension in the vertical direction is dead space.

Lenticular array 12 which may be positioned adjacent to pixel array 11 is preferably separated by a distance "d" which is the distance between the lenticular array and the pixel array. S is the desired or anticipated distance between a viewing perspective represented in FIG. 1A as, for example, eyes 13–14 and the front of the autostereoscopic display, as will be described in greater detail hereinafter with respect to equations (4)–(5) which are provided later. The space between pixel array 11 and lenticular array 12 may be occupied by air, a vacuum or the like, or any optically translucent material such as glass, or the like.

As will be understood by one skilled in the art, each pixel group 111 within pixel array 11 includes pixel columns corresponding to independent image perspectives which, when viewed together form the autostereoscopic display image. For instance, in FIG. 1A, each pixel group 111 is shown including two (2) pixel columns—left eye pixel column 112 and right eye pixel column 113. A pitch associated with the pixel groups 111 may be defined by the center-to-center spacing of the pixel groups 111, usually corresponding to a width of the pixel columns 112–113 therein. In display 11 the pitch of pixel groups 111 within pixel array 11 is 2WP, where WP is the width of each pixel column 112, 113 within the pixel array 11. The pitch of a pixel group 111 having n pixel columns is therefore usually defined as nWP. However, the pitch may vary from nWP if lenses within the lenticular array 12 are overlapping or separated.

In the exemplary autostereoscopic display illustrated, lenticular array 12 includes several adjacent lenses, each lens 121–123 within lenticular array 12 corresponding to different pixel columns 112–113 within the pixel groups 111 of the pixel array 11. Autostereoscopic effect may vary by degrees or levels of how well the 3-D effect is conveyed to the viewer. The degree of autostereoscopic effect may be controlled by determining the pitch of lenses 121–123 within lenticular array 12 which may be defined by a center-to-center spacing of adjacent lenses 121–123 within lenticular array 12. It should be noted that while the spacing may typically correspond to a width WL of lenses 121–123, the pitch may be different depending on whether the particular configuration of lenses 121–123 is overlapping or separated. It should further be noted that pitch WL of the lenses 121–123 within lenticular array 12 preferably differs from the pitch 2WP of the corresponding pixel groups 111 within pixel array 11. In particular, pitch WL of lenses 121–123 is preferably smaller than pitch 2WP of pixel groups 111. The difference in pitch between the lenses 121–123 and corresponding pixel groups 111 results in a center of at least one of the lenses 121–123 within lenticular array 12 and a center of corresponding pixel columns 112–113 within pixel array 11 being offset with respect to the long axis of the cylindrical lenses within lenticular array 12.

As shown in FIG. 1A, lens 121 of lenticular array 12 corresponds to a pair of pixel columns 112–113 located adjacent to eye bisector 15, and lens 122 corresponds to a next pair of pixel columns 112–113 that are displaced from eye bisector 15 by the pixel columns 112–113 corresponding to lens 121. As shown, a center C1 of lens 121 and a center C1' of corresponding pixel columns 112–113 are offset relative to eye bisector 15, and a center C2 of lens 122 and a center C2' of corresponding pixel columns 112–113 are offset relative to eye bisector 15.

Because pitch WL of lenses 121–122 is smaller than the pitch 2WP of pixel groups 111, the offset of the lenses 121–123 increases in either direction away from an aligned point, e.g., from eye bisector 15 in FIG. 1A. For instance, the center C1 of lens 121 is linearly offset from the center C1' of corresponding pixel columns 112–113 by a distance DL1, as represented by equation (1) such that:

$$DL1=(2WP-WL)/2 \qquad (1),$$

where 2WP represents the pitch of the pixel groups 111 in which array 11, and WL represents the pitch of the lens 121–123 within lenticular array 12, as discussed above.

Similarly, the center C2 of lens 122 is linearly offset from the center C2' of corresponding pixel columns 112–113 by a distance DL2, as represented by equation (2) such that:

$$DL2=2(2WP-WL)/2=2WP-WL \qquad (2).$$

That is, the distance between the centers of lenses 121–122 and corresponding pixel columns 112–113 is multiplied based on a number of lenses 121–123 separating the lens of interest from a lens that is linearly aligned with its corresponding pixels columns. Thus, when N lenses separate a lens of interest from an aligned lens/pixel group combination, the offset DLN between the center of the Nth lens and the center of the Nth group of pixel columns 112–113 can be calculated based on equation (3) as follows:

$$DLN=N/2(2WP-WL) \qquad (3).$$

The orientation of pixel array 11, lenticular array 12 and viewer eyes 13 and 14 is described geometrically according to equation (4):

$$\frac{S}{WL} = \frac{(S+d)}{2WP}, \qquad (4)$$

where S represents the distance from viewer eyes 13 and 14 to lenticular array 12, WL represents the pitch of lenses 121–123 within lenticular array 12 as described above, d represents a distance of separation between lenticular array 12 and pixel array 11, and 2WP represents the pitch of the pixel groups 111 within pixel array 11 as described above. Thus, solving for pitch WL, the center-to-center spacing WL of the lenses 121–123 within lenticular array 12 can be determined as follows:

$$WL = \frac{S(2WP)}{S+d}. \qquad (5)$$

That is, anticipating both the distance S between a viewer and the lenticular array 12 located at the front of the autostereoscopic display and the desired separation between pixel lens arrays 11 and 12, equation (5) can be used to determine an appropriate pitch WL for lens 121–123 within a lenticular array of the display such that the desired autostereoscopic effect is achieved. The desired separation "d" between the pixel and lenticular arrays 11 and 12 may be determined based on various criteria such as the size and/or appearance of the resulting display. Typically, the separation d is representative of the focal length of the lenses in the lenticular array.

Exemplary parameters that have been used to create and orient an autostereoscopic display in accordance with one exemplary embodiment of the above-described invention include a distance d of 2 mm, a distance DL of approximately of 1 $\mu$m, a pitch WP of approximately 250 $\mu$m, a pitch WL of approximately 500 $\mu$m, a distance D of approximately 500 mm, and an approximate eyeball separation of 70 mm. It should further be noted that an autostereoscopic display in accordance with various exemplary embodiments of the present invention, including a lenticular array as described above may be manufactured or, alternatively, a conventional display such as, for example, an LCD display, or the like, may be retrofitted for either an entire display or only a selected portion of a display.

Figure 1B:
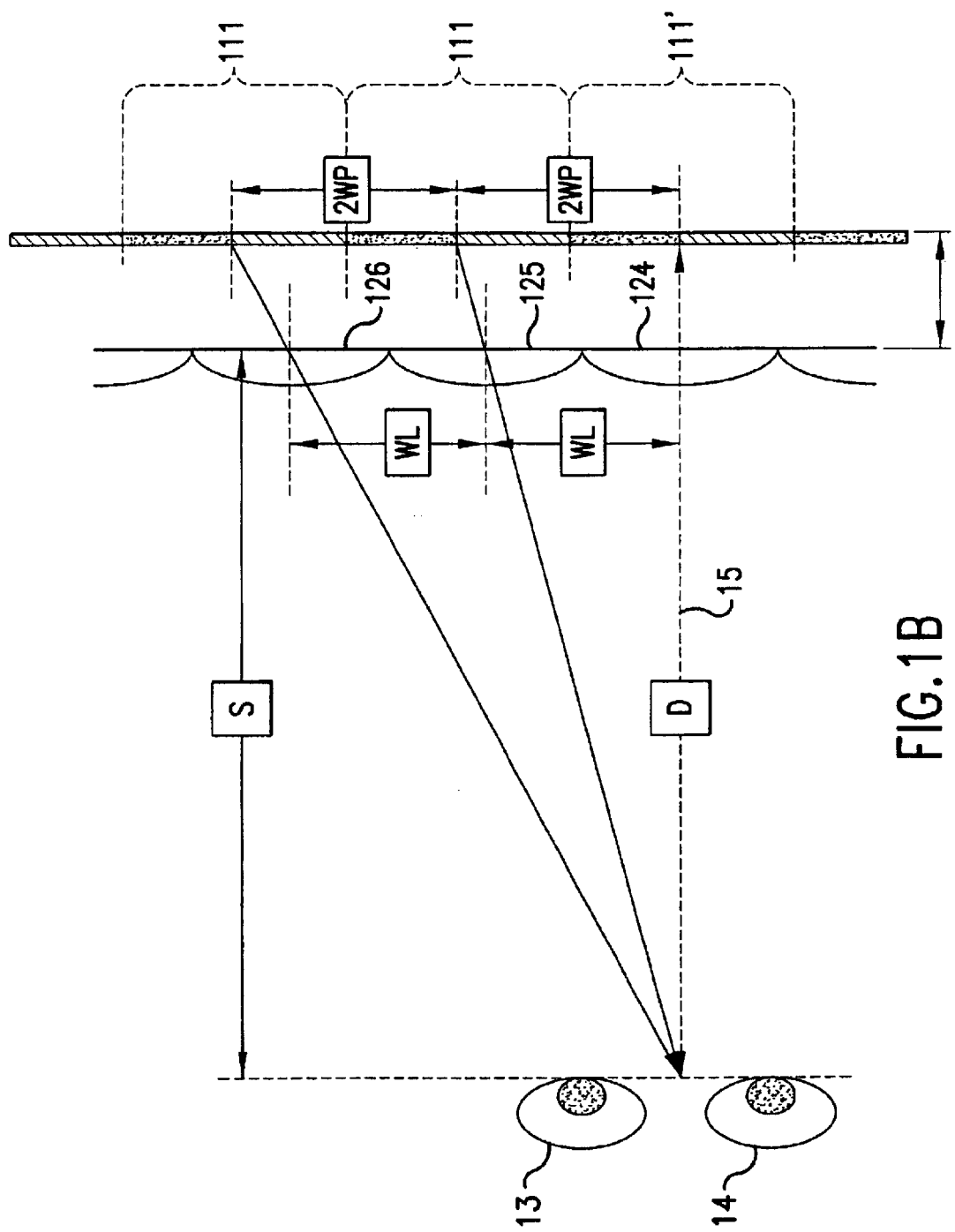
FIG. 1B is a diagram further illustrating an exemplary structural orientation of a pixel array and a lenticular array.

Reference is made to an exemplary autostereoscopic display as illustrated in FIG. 1B. Again, due to the similarity between FIG. 1A and FIG. 1B, the reference numerals shown in FIG. 1B and the accompanying discussion herein below relate to aspects of the display which differ from those illustrated in FIG. 1A.

As can be seen, the displays shown in FIGS. 1A and 1B differ with respect to the alignment of the lenses within lenticular array 12 relative to the pixel groups 111 within pixel array 11. FIG. 1B illustrates a configuration in which the position of the lenticular array 12 is shifted slightly from the position shown in FIG. 1A relative to pixel array 11, or alternatively, the viewing position is shifted.

More specifically, in FIG. 1B, the center of lens 124 within lenticular array 12 is aligned with the center of pixel group 111' within pixel array 11 with respect to the long axis of the cylindrical lenses within lenticular array 12. In FIG. 1B, this alignment is achieved at eye bisector 15.

The preferred alignment position is achieved at the center of the autostereoscopic display. Because of this alignment, the lenses 124–126 of FIG. 1B, each correspond to pixel columns 112–113 within a single pixel group 111 or 111', in contrast with the lenses of FIG. 1A which each correspond to pixel columns 112–113 in different pixel groups 111. Nevertheless, the pitch WL of lenses 124 and 126 remains smaller than the pitch 2WP of corresponding pixel columns 111 and 111', such that lenses 125–126 other than central lens 124 are offset from their corresponding pixel columns 111 with respect to the long axis of cylindrical lens within lenticular array 12. Therefore, for reasons similar to those discussed above with respect to equations (1)–(3), the offset between the center of lenses 125–126 and their corresponding pixel columns 111 increases as the distance from central lens 123 increases. Such offsets will become important for independent viewing of right and left interlaced image "slices" by respective right and left eyes as will be described in greater detail hereinafter.

FIG. 2A illustrates a front view of a portion of pixel array arranged to simultaneously display two views of an image to enable an autostereoscopic display according various exemplary embodiments of the present invention. Pixel columns 112 and 113 can be configured to display color images, for example, as having R,G,B color elements. It should further be noted that R,G, and B color elements are vertically aligned.

As shown in FIG. 2B, left and right view information may be arranged on pixel array 11 such that images directed toward the left eye 13 and images directed toward the right eye 14 are interlaced. Therefore, images intended to be viewed left and right eye are displayed on alternating pixel columns 112, 113 within the pixel array 11. It should be noted that although pixel array 11 includes several pixel columns, a sample of only four pixel columns from within pixel array 11 is illustrated in FIGS. 2A and 2B.

Figure 2C:
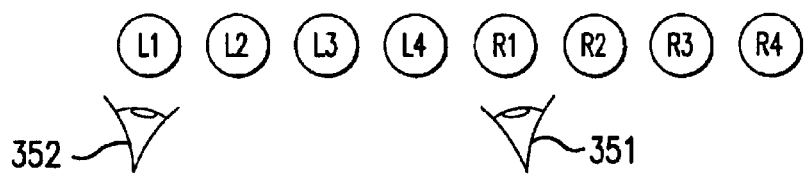
FIG. 2C is a diagram illustrating 8 interlaced views, including 4 left eye views and 4 right eye views.

FIG. 2C shows the concept where generalized multiple views can be interlaced. The spacing between the views is such that when the head moves in a left and right motion the eyes pass through the multiple views as illustrated in FIG. 2C. This illustrates eight interlaced views. The head of the viewer is moved left and right to see the multiple views. In one exemplary embodiment, the distance between a right and left view, say view left view 1 and right view 1 is nominally 55 mm. The observer must be a distance from the display determined by 55/tan(θ) where θ equals the angular separation between left and right views, approximately equal to the viewer eye spacing so that the left and right views will be presented to the left and right eyeballs. The angular magnification of the lenslets and the pixel pitch of the monitor determine the angular separation between the views.

As previously described, pixel array 11 includes several pixel columns arranged in parallel to the longitudinal axis of cylindrical lenses within lenticular lens array 12. Lenses are preferably arranged such that left eye 13 perceives an image created by visually joining all pixel columns 112 associated with a left eye image, designated in the drawings for example by dark shading. Right eye 14 preferably perceives an image created by visually joining all pixel columns 113 associated with a right eye image, designated in the drawings for example, by diagonal lines. It should be noted that the resolution of a stereoscopic device is related to the number of pixel columns in the display and the number of pixel columns per pixel group. A flat screen display, for example, with P pixel columns that each have Q pixels has a non-autostereoscopic image resolution of P×Q pixels. By contrast, the same flat screen display has an autostereoscopic image resolution equal to P*Q/n pixels, assuming n views in the autostereoscopic display. In the exemplary systems discussed above, the image resolution would be P*Q/2 pixels since each pixel group 111 has two (2) pixel columns 112–113 to achieve two (2) separate views.

As described, problems arise in displays where color elements are vertically aligned in that the focus of a cylindrical lens may fall on only one color element of the associated pixel column. It will be appreciated that in order to view relatively natural undistorted color all color elements of an associated pixel must be viewed together. Some systems have addressed this problem by rotating the display 90 degrees or using more than one lenticular layer. Both of these solutions are difficult to use, for example, as a lenticular mask or overlay layer over a conventional display used in a conventional manner.

Figure 3:
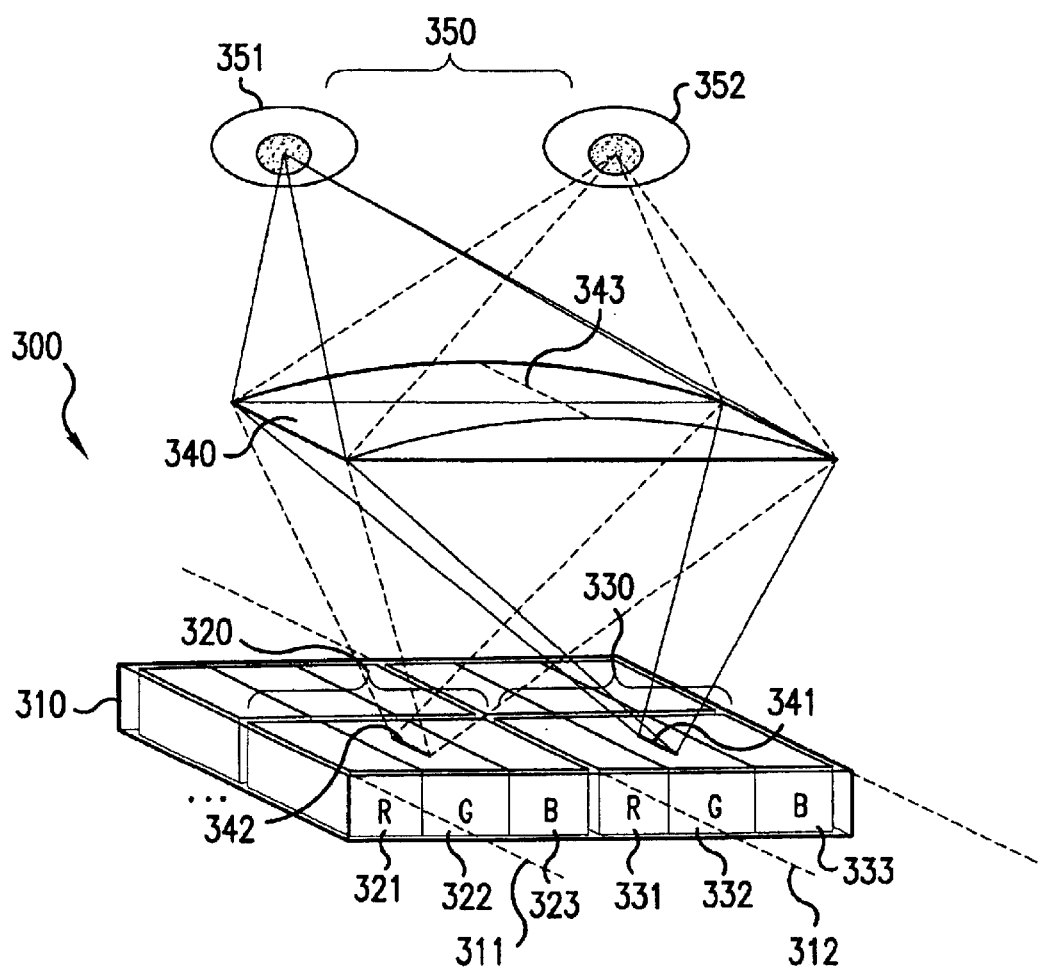
FIG. 3 is a diagram further illustrating an exemplary conventional pixel array with color elements and lenticular array.

FIG. 3 shows a viewing perspective 350 may include left eye 352 and right eye 351 in viewing scenario 300. As previously described, left and right images may be displayed in left pixel column 311 and right pixel column 312 respectively. Pixels 320 and 330 of pixel array 310 may further include red, green, and blue color elements R 321, G 322, B 323, R 331, G 332, and B333 respectively.

Also, please note that in FIG. 3, the thickness of the red, green, and blue color elements are shown for illustrative purposes only and are not drawn to any scale. This means that the thickness of the color elements can be much thinner than the apparent thickness indicated in the drawing and can be constructed in any desired manner.

When left eye 352 and right eye 351 focus through cylindrical lens 340, having vertical focal axis 343, corresponding focal orientations 341 and 342 are realized. Because focal orientations 341 and 342 are concentrated on, for example, color elements G 332 and G 322, a viewer may see a stereoscopic image, but it will be color distorted in that the image will appear green. Accordingly, if the perspective is shifted such that focal orientations 341 and 342 are concentrated on, for example, color elements R 331 and R 321, or B 333 and B 323, the viewer will see a red or a blue image respectively. Such a situation is clearly unacceptable to a viewer using the stereoscopic display.

Therefore in accordance with various exemplary embodiments of the present invention, free form lenses of various types may be formed, for example, through a grayscale etching process using Deep Reactive Ion Etching (DRIE) as further described in PCT/US01/42629 entitled "Deep Grayscale Etching of Silicon," filed Oct. 10, 2001, to correct for the vertical orientation of the focal axis by shifting the focal axis. Gray scale technology is particularly well-suited to constructing lenslet arrays for implementing the present invention.

Figure 4:
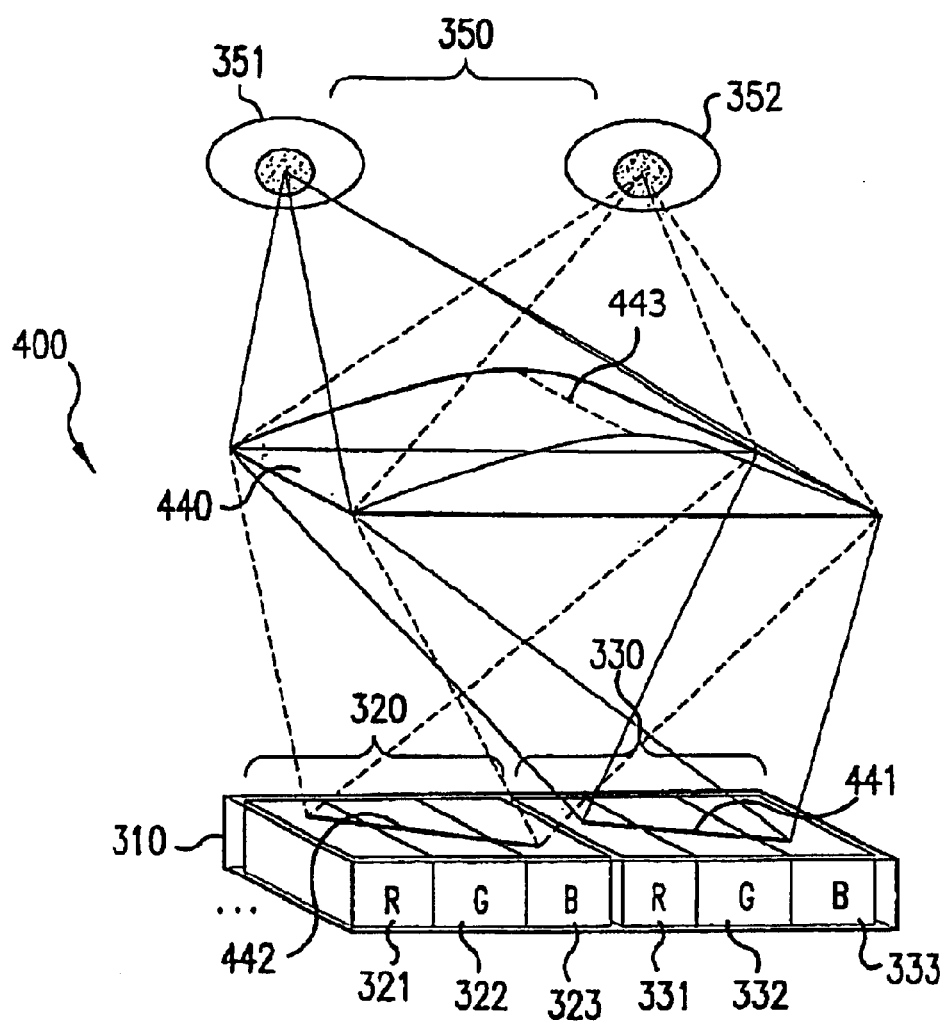
FIG. 4 is a diagram further illustrating an exemplary pixel array with color elements and lenticular array in accordance with various exemplary embodiments of the present invention.

FIG. 4 illustrates an example of such a free form lens. From the same viewing perspective 350 as the one shown in FIG. 3, left eye 352 and right eye 351 may focus through free form lens 440 which may be more accurately described as a rotated cylindrical lens having a rotated focal axis 443. It can be seen that focal axis 443 in accordance with various exemplary embodiments of the present invention may be rotated to a diagonal orientation with, for instance, a vertical axis parallel to the columnar components of an exemplary pixel array. With such a rotation, focal orientations 441 and 442 are concentrated across all color elements, R 331, G 332, B333, R 321, G 322, and B 323 respectively for left eye 352 and right eye 351.

Figure 5A:
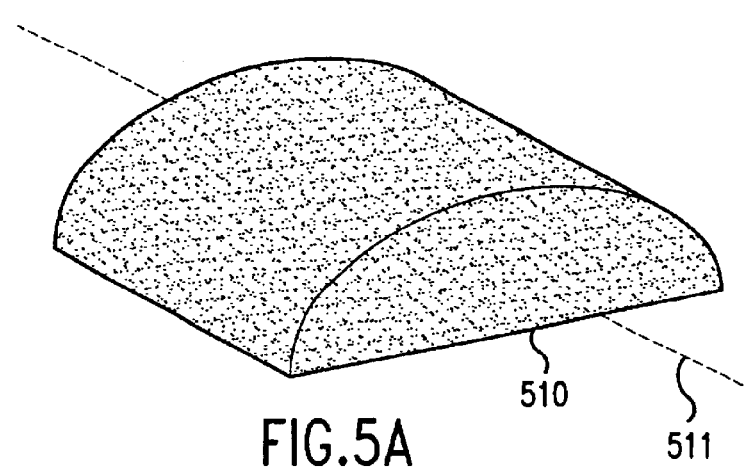
FIG. 5A is a diagram illustrating an exemplary conventional cylindrical lens in accordance with various exemplary embodiments of the present invention.
Figure 5B:
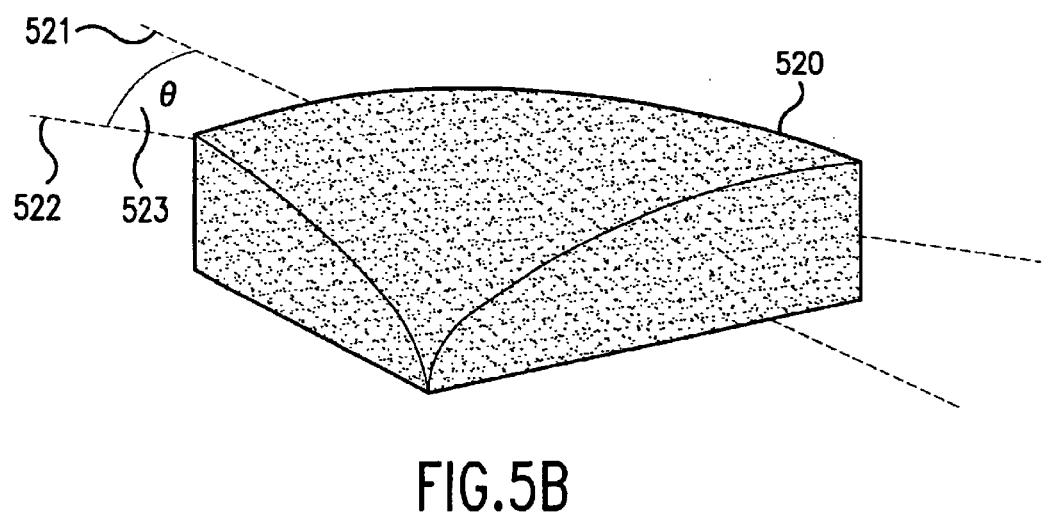
FIG. 5B is a diagram illustrating an exemplary rotated cylindrical lens in accordance with various exemplary embodiments of the present invention.
Figure 6A:
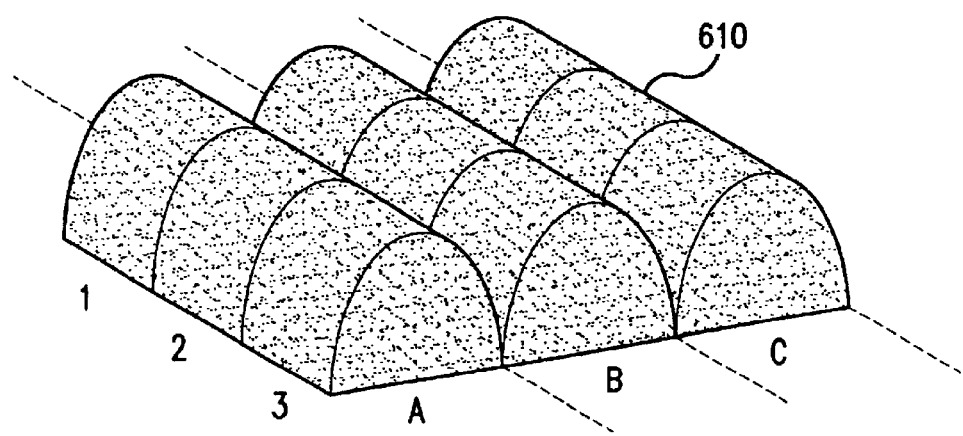
FIG. 6A is a diagram illustrating an exemplary conventional cylindrical lens array in accordance with various exemplary embodiments of the present invention.
Figure 6B:
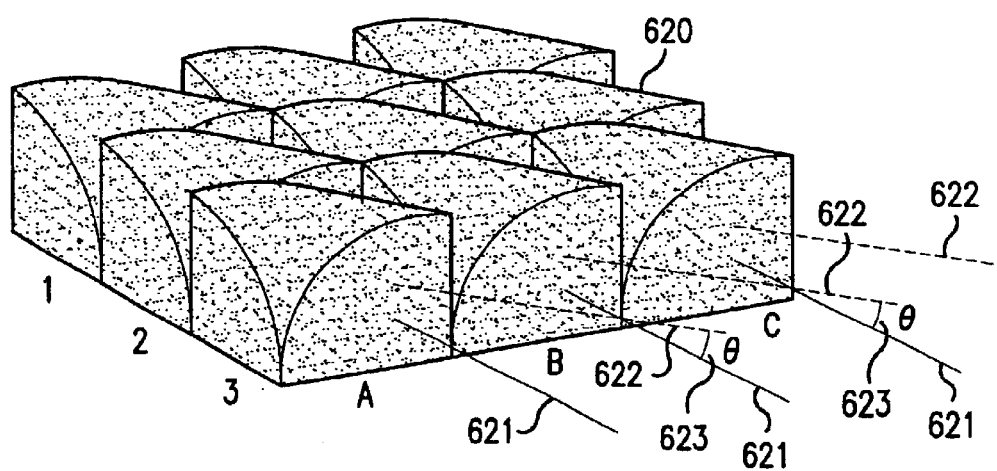
FIG. 6B is a diagram illustrating an exemplary rotated cylindrical lens array in accordance with various exemplary embodiments of the present invention.

A more detailed view of a conventional cylindrical lens and a rotated cylindrical lens are illustrated in FIGS. 5A (conventional cylindrical lens) and 5B (rotated cylindrical lens). As can be seen, conventional cylindrical lens 510 has a focal axis 511 which is parallel to the longitudinal axis of the lens and in applications as described herein above is parallel to pixel columns and, more specifically, to vertically aligned columns of color elements associated with pixel columns leading to color distortion. Conversely, rotated cylindrical lens 520 has a focal axis 522 which is rotated from longitudinal axis 521 by the angle θ 523. Individual lens elements may further be combined to form lens arrays for lenticulars which may be used to adapt a conventional display for autostereoscopic display as illustrated in FIGS. 6A and 6B. Conventional cylindrical lens array 610 (FIG. 6A) may be configured with a series of cylindrical lens arranged for example, along rows 1, 2, and 3 and columns A, B, and C having focal axis along longitudinal axis 611. Conversely, rotated cylindrical lens array 620 (FIG. 6B) has a rotated focal axis 623 rotated from longitudinal axis 621 by the angle θ shown in 623. It should be noted that lens array 620 may be formed from a suitably translucent material etched using grayscale DRIE or may alternatively be etched directly into the surface of materials associated with the display. It should be noted that by using grayscale etching technology, 100% fill factors may be achieved. Accordingly, both existing and newly produced displays may be constructed for autostereoscopic display in a cost effective manner with minimal modification of existing hardware.

It is desirable to eliminate the image of the gap between the pixels. A combination of two approaches will eliminate the effect. First, using gray scale lithographic methods and technologies, the radius of curvature of the microlens can be precisely controlled so that the image of the gap between the pixels can be blurred out just enough so that it is not visible, but not blurred out so much that the views begin to overlap. FIG. 5A illustrates one lens configuration that can be adapted to the present invention. The image of the pixels is blurred out at the plane of observation, so that as the eye passes from one image to the next, there is a slight overlap in the light coming from the pixels. The amount of overlap between the pixels should be arrived at iteratively but should not exceed 30%.

Figure 5C:
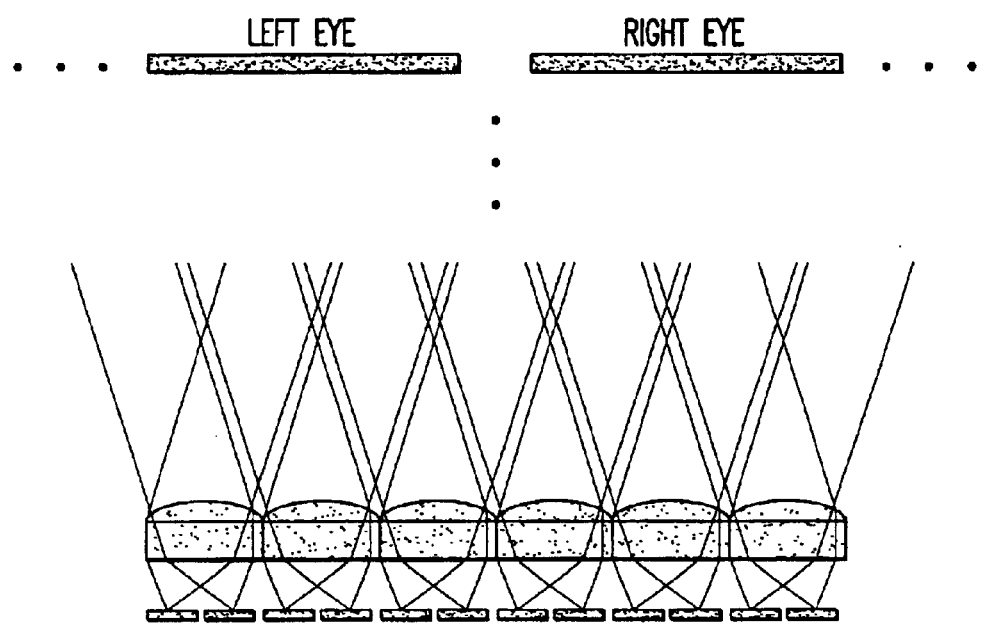
FIG. 5C shows how the 2-view system separates the left and right eye views.

FIG. 5C shows how the 2-view system separates the left and right eye views. It shows the image of the pixels projected to infinity (indicated by the ". . ." shown in the drawing). The distance between the lenticular array and the observer's eye is effectively considered infinity, since the distance from the lens to the observer's eye is much greater than the distance from the pixels to the lens.

Note the space between the pixels in each of the left and right views. The gap between the pixels being imaged is transferred to the image at infinity. As the head moves from left to right these gaps are observed to be black lines. This can be a very distracting artifact to a viewer while viewing the 3-D image on the stereoscopic display.

The second approach is to blur out the dead space between the pixels by tilting the lenticular array segment over the pixels.

FIG. 7A show an example layout of lenslet of a lenslet array as shown from the top. In one exemplary embodiment, the width of the lens is 0.0894 mm (700) and the length is 0.3588 mm (702). A section 704 of a lens is also shown in FIG. 7A. Typically, the center of curvature 85 degree (703) is centered on the lenslet. Note that a dotted line is shown going down the center of each lens. This line indicates the cylindrical axis of the cylindrical lens. The cylindrical axis can be tilted at an angle between 5 and 55 degrees, depending on the layout of the display pixels and the amount of dead space. This rotates the image of the pixel so that at any position the gap between the pixels is spread between the views.

For best results, both methods (rotation and blurring) should be used. Any black lines in the image can be removed completely by blurring and rotating the image. The feedback mechanism used to achieve this process is that the blurring and rotation of the lenses causes the interlaced views to blend together such that there is a spatial overlap in the light from one view and its neighboring view. This method also serves to give a gentle transition between views in a multiple view system as is depicted in FIG. 2C. Again in FIG. 2C, the spacing between the views is such that when the head moves in a left and right motion, the eyes pass through the multiple views as shown in FIG. 2C.

Figure 8:
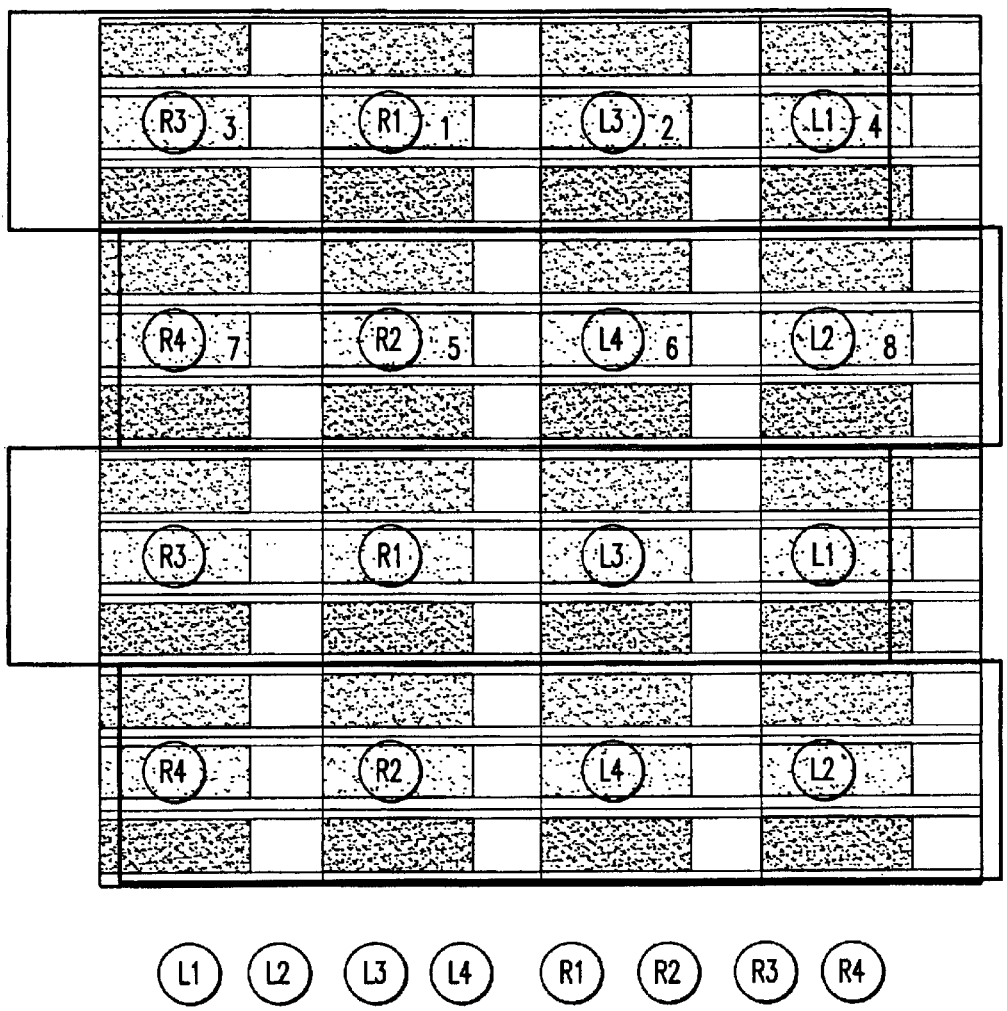
FIG. 8 shows an exemplary method for interlacing multiple images.

FIG. 8 shows a method for interlacing multiple images. In this example, the present invention interlaces 8 total images. Please note that there is no maximum number of views that the present invention can support, however there is a minimum of two (2) views. A tradeoff exists between the number of views. The more views that are interlaced, the lower the resolution. In the eight view scheme illustrated in FIG. 8, the views are interlaced four (4) along the horizontal and two (2) along the vertical for a total of 4×2 views. This has the advantage of not imposing a design hit or penalty in resolution of eight (8) in one dimension.

The numbers inside the circles on the pixels indicates the views. The outlines of the cylindrical lenses are indicated by the rectangles drawn with the thick black lines. The mapping of the pixels to the horizontal fan-out of the views is shown underneath the pixels. Note that the views are interlaced in the vertical dimension as well. The distance between the pixel center and the center of the cylindrical lens determines the angle of a view. The centers of the cylindrical lenses are in the center of the rectangles.

FIG. 7B shows the layout of the lenses without the pixels. Note that the alternating rows of pixels have an offset (710). The offset is determined by the desired angular separation of the views. In one exemplary embodiment of this configuration, the width of the lens is 0.090 mm (706), the length is 0.3590 mm (708) and the offset (710) is 0.045 mm. A section of the lens 712 is also shown in FIG. 7B. Typically, the center of curvature 90 degree (709) is centered on the lenslet. For example, for this design the pitch of the pixels is 90 microns. Thus, the offset between the rows is 45 microns, in order to obtain a uniform spacing between the views interlaced in the vertical direction.

Figure 9:
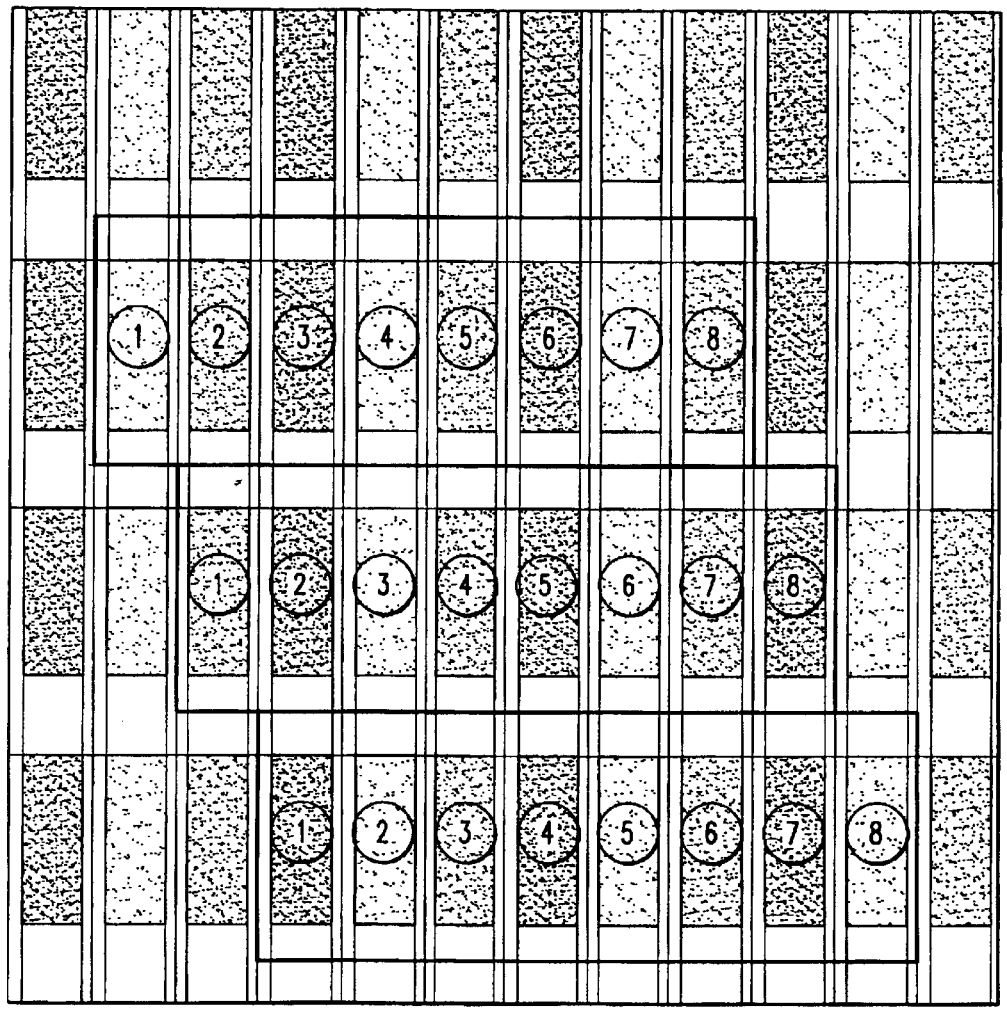
FIG. 9 shows an exemplary method for realizing a 3-D system when RGB fanout is parallel to view fanout.

So far, fan-out of the views has been perpendicular to the spread out direction of the red-green-blue pixels. If the spread out is parallel to the red-green-blue direction then if simple cylindrical lenses are used the colors will be spread out as well as the views. This generates an unacceptable rainbow effect that almost completely obscures the viewing. FIG. 9 shows a method for realizing 3-D imaging without color spreading. The numbers in the circles represent the views of the 3-D image. The circles are shown superimposed on a lens. Views 1–4 are right eye views R1–R4 and views 5–8 are left eye views L5–L8. The black lined rectangles represent the outline of the cylindrical lenses. Note that the lenses are staggered.

FIG. 7C also shows a drawing of the lens without the pixels, showing the repeating pattern 715 of the lenslet array. In one exemplary embodiment of the present invention, the length of the lens (718) is 0.2395 mm, the width of the lens (714) is 0.090 mm. The offsets are 0.030 mm (720) and 0.030 (721). A section of the lens is shown in 722. Typically, the center of curvature 90 degree is centered on the lenslet. The red green and blue pixels are staggered along a diagonal line. For example, view 1 has a green pixel on the top row, a red pixel in the middle row and a blue pixel on the bottom row. In effect, the red green blue instead of organized in a vertical fashion is organized along a diagonal.

While there have been illustrated and described what are at present considered to be preferred embodiments of the present invention, it will be understood by those skilled in the art that various changes and modifications may be made, and equivalents may be substituted for elements thereof without departing from the true scope of the present invention. For instance, the term lenticular array may be interpreted to include various arrangements of lens structures such as rotated cylindrical lenses or rotated microlenses. This applies equally to arrays 12 and 60. In addition, various exemplary embodiments of the present invention may be applied to a variety of types of displays, including flat panel displays such as electroluminescent (EL) displays, field emission displays (FED), vacuum fluorescent (VF) displays, liquid crystal (LC) displays, organic light emitting diode (OLED) displays, high temperature poly-silicon (HTPS) and low temperature poly-silicon (LTPS) displays, and LED displays.

In view of the foregoing disclosure, one of ordinary skill would readily appreciate that any data structure capable of achieving the display described herein could be used to drive this display device. Several preferred data structures and alternate systems are described in copending application entitled "AN AUTOSTEREOSCOPIC DISPLAY SYSTEM AND A DATA STREAM AND METHOD THEREFORE", by Rodney L. Clark, Daniel M. Brown, John Karpinsky and Peter Erbach, filed in the U.S. Patent and Trademark Office by Express Mail on Jan. 26, 2000 and commonly owned with the present application, the contents of which application are incorporated into this application in their entirety.

In addition, many modifications may be made to adapt a particular situation or material to the teaching of the present invention without departing from the central scope thereof.

Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. An autostereoscopic display for supplying a stereoscopic image when viewed from an intended viewing perspective, comprising: a pixel array including a plurality of pixels, each of the plurality of pixels having at least two subpixel elements extending in a horizontal direction from the intended viewing perspective; and a lenslet array including a plurality of lenses, the lenslet array positioned between the intended viewing perspective and the pixel array, the lenslet array configured to transpose a focus orientation associated with the at least two subpixels of the each pixel from a generally vertical orientation to a generally horizontal orientation such that the at least two subpixel elements are within the transposed focus orientation and the transposed focus orientation is generally diagonal; wherein at least the each pixel is focused by a corresponding one of the plurality of lenses.

2. The autostereoscopic display according to claim 1, wherein the plurality of lenses include a plurality of rotated cylindrical lenses.

3. The autostereoscopic display according to claim 2 wherein each of the plurality of rotated cylindrical lenses has a generally diagonal focus.

4. The autostereoscopic display according to claim 1, wherein the each of the plurality of pixels had at least three subpixel elements.

5. The autostereoscopic display according to claim 4 wherein the at least three subpixel elements include a red subpixel element, a green subpixel element and a blue subpixel element.

6. An autostereoscopic display of claim 1 further comprising: a pitch WL of said lenses within said lenslet array, where said pitch differs from a pitch 2WP of said pixel array; and wherein the difference in pitches between said pitch WL of said lenses and said pitch 2WP of said pixel array results in a center of at least one said lens of said lenslet array and a center of a corresponding pixel column within said pixel array being offset with respect to a long axis of at least one cylindrical lens with said lenslet array.

7. The autostereoscopic display of claim 6 wherein said pitch WL is smaller than said pitch 2WP.

8. The autostereoscopic display of claim 6 wherein said offset of said lenses increases in either direction away from an alignment point.

9. The autostereoscopic display of claim 8 wherein said alignment point bisects a distance between a left eye and a right eye of a human observer using said autostereoscopic display.

10. An autostereoscopic display, comprising: a pixel array including a plurality of pixel groups;

a lenslet array positioned between the pixel array and a viewing perspective, the lenslet array including a plurality of lenses corresponding generally to a plurality of pixels of the pixel array such that each of the plurality of lenses of the lenslet array corresponds to each of the pixel groups; and wherein the lenslet array is configured to transpose a focal orientation of at least two of the plurality of lenses.

11. The autostereoscopic display according to claim 10, wherein a pitch of the plurality of lenses of the lenslet array is substantially the same as a pitch associated with at least two of the plurality pixels.

12. The autostereoscopic display according to claim 10, wherein the plurality of pixels include a plurality of color pixels.

13. The autostereoscopic display according to claim 10, wherein the lenslet array is separated from the pixel array by a predetermined distance.

14. The autostereoscopic display according to claim 10, wherein the lenslet array is attached to the pixel array after the pixel array is fabricated.

15. An autostereoscopic display, comprising:

a pixel array including a plurality of pixel groups;

a lenslet array positioned between the pixel array and a viewing perspective, the lenslet array including a plurality of lenses corresponding generally to a plurality of pixels of the pixel array such that each of the plurality of lenses of the lenslet array corresponds to each of the pixel groups; and where the lenslet array is configured to transpose a focal orientation of at least two of the plurality of lenses, and wherein each of the plurality of color pixels includes a plurality of color components arranged in a first direction, and the plurality of lenses of the lenslet array include a plurality of rotated cylindrical lenses having a transposed axis extending from around a second direction to around the first direction generally perpendicular to the second direction.

16. The autostereoscopic display according to claim 15, wherein each of the pixels includes at least two color components arranged in a horizontal direction with respect to the display, and the plurality of lenses of the first array comprise rotated cylindrical lenses having a transposed axis extending from around a vertical direction to around the horizontal direction with respect to the display according to an arbitrary axis of rotation.

17. An autostereoscopic display, comprising:

a pixel array including a plurality of pixel groups;

a lenslet array positioned between the pixel array and a viewing perspective, the lenslet array including a plurality of lenses corresponding generally to a plurality of pixels of the pixel array such that each of the plurality of lenses of the lenslet array corresponds to each of the pixel groups; and where the lenslet array is configured to transpose a focal orientation of at least two of the plurality of lenses, and wherein each of the pixels includes at least two color components arranged in a horizontal direction with respect to the display, and the plurality of lenses of the first array include rotated cylindrical lenses having a transposed axis extending from around a vertical direction to around the horizontal direction with respect to the display according to a diagonal axis of rotation.

18. A method of displaying multidimensional images on an autostereoscopic display, comprising: generating one or more images using a pixel array, the pixel array including a plurality of pixels; projecting portions of the one or more images generated by each of the plurality of pixels through a corresponding plurality of lenses of a lenslet array; and transposing the projected portions of the one or more images from a substantially vertical focus orientation to a substantially horizontal focus orientation by rotating the focal axis of the plurality of lenses.

19. The method according to claim 18, wherein the step of generating one or more images further includes generating the one or more images using a color pixel array including a plurality of color pixels, each of the color pixels including at least two color components arranged in a first direction, the plurality of lenses of the lenslet array including a plurality of rotated cylindrical lenses each of the rotated cylindrical lenses having a focal axis extending generally from around a second direction toward the first direction generally perpendicular to the second direction along a diagonal.

20. An array of cylindrical lenses each formed using grayscale Deep Reactive Ion Etching to have a diagonal focal axis wherein the diagonal focal axis extends from a generally vertical orientation toward a generally horizontal orientation.

21. The array of cylindrical lenses according to claim 20, wherein the array has a 100% fill factor.

22. An autostereoscopic display for supplying a stereoscopic image when viewed from an intended viewing perspective comprising: a lenslet array including a plurality of lens elements; a cylindrical axis running down the center of each said lens element in said lenslet array and wherein said cylindrical axis can be tilted at an angle that is dependent upon a layout and an orientation of a plurality of display pixels of said autostereoscopic display where said tilting rotates the image of said pixels so that any position a gap between said pixels is spread between a set of views.

23. The autostereoscopic display according to claim 22 where said cylindrical axis can be tilted at an angle between 5 and 55 degrees.

24. The autostereoscopic display according to claim 23 where an image formed on said display pixels implements a black line removal process by blurring and rotating an image.

25. The autostereoscopic display according to claim 24 where said blurring and rotating of said image is performed in accordance with an established blurring and rotating value.

26. The autostereoscopic display according to claim 22 where said lenslet array is a lenticular array.

27. The autostereoscopic display according to claim 22 where said lens element is a microlens element.

28. A method of displaying multidimensional images on an autostereoscopic display comprising:
    establishing a lenslet array to include a plurality of lens elements; interlacing a plurality of multiple images on said display, the multiple images composed of pixels, the pixels having horizontally aligned color pixels having vertical focal orientation;
    fanning said multiple images out into an angular array;
    establishing a plurality of views in a vertical and horizontal direction by rotating at least one of the vertical focal orientations; and
    mapping said plurality of views onto a plurality of pixels making up said display; and generating a three dimensional image from said fanned out multiple images.

29. The method of claim 28 where said lenslet array and said lens elements are constructed using gray scale technology and construction methods.

30. A method of displaying multidimensional images on an autostereoscopic display comprising:
    establishing a lenslet array to include a plurality of lens elements; interlacing a plurality of multiple images on said display;
    fanning said multiple images out into an angular array; establishing a plurality of views in a vertical and horizontal direction;
    mapping said plurality of views onto a plurality of pixels making up said display; generating a three dimensional image from said fanned out multiple images; and
    establishing a lenslet array including a plurality of lens elements; using a cylindrical axis running down the center of each said lens element in said lenslet array and wherein said cylindrical axis can be tilted at an angle that is dependent upon a layout and an orientation of a plurality of display pixels of said autostereoscopic display.

31. The method according to claim 30 where said cylindrical axis can be tilted at an angle between 5 and 55 degrees.

32. The method according to claim 30 where an image formed on said display pixels implements a black line removal process by blurring and rotating an image.

33. The method according to claim 32 where said blurring and rotating of said image is performed in accordance with an established blurring and rotating value.

* * * * *